United States Patent
Casella

(10) Patent No.: US 6,435,757 B1
(45) Date of Patent: Aug. 20, 2002

(54) MECHANICAL COUPLING FOR ELASTIC AXIAL AND RADIAL CONSTRAINT WITH TORSIONAL FREEDOM, ESPECIALLY FOR ELASTIC PIVOTS AND SUSPENSIONS AND THE LIKE

(75) Inventor: Giuseppe Casella, Moncalieri (IT)

(73) Assignee: F.I.B.E.T. S.p.A., Moncalieri (IT)

( * ) Notice: Subject to any disclaimer, the term of this patent is extended or adjusted under 35 U.S.C. 154(b) by 0 days.

(21) Appl. No.: 09/155,133

(22) PCT Filed: Dec. 6, 1996

(86) PCT No.: PCT/EP96/05467

§ 371 (c)(1),
(2), (4) Date: Dec. 31, 1998

(87) PCT Pub. No.: WO97/36120

PCT Pub. Date: Oct. 2, 1997

(30) Foreign Application Priority Data

Mar. 25, 1996 (IT) ......................................... TO96A0228

(51) Int. Cl.$^7$ ............................................. F16C 27/06
(52) U.S. Cl. ................... 403/225; 384/222; 267/140.12
(58) Field of Search ................................ 403/225, 150, 403/158, 221, 224, 226, 228, 164, 165, 78; 384/220, 221, 222, 276; 267/140.12

(56) References Cited

U.S. PATENT DOCUMENTS

| 2,195,997 A | * | 4/1940 | Perkins .................... 403/165 X |
| 4,491,429 A | * | 1/1985 | Matoba et al. .............. 384/221 |
| 4,667,943 A | * | 5/1987 | Izumi et al. ............ 403/228 X |
| 4,744,677 A | * | 5/1988 | Tanaka et al. .......... 403/225 X |
| 4,809,960 A | * | 3/1989 | Kakimoto et al. ....... 403/225 X |
| 5,172,893 A | * | 12/1992 | Bouhier et al. ........ 267/140.12 |
| 5,181,784 A | * | 1/1993 | Jordens et al. .......... 403/225 X |
| 5,261,748 A | * | 11/1993 | Kameda ..................... 384/222 |
| 5,593,233 A | * | 1/1997 | Kammel et al. ............. 384/222 |
| 5,620,261 A | * | 4/1997 | Salz ............................ 384/276 |

* cited by examiner

Primary Examiner—Lynne H. Browne
Assistant Examiner—David E. Bochna
(74) Attorney, Agent, or Firm—Keil & Weinkauf

(57) ABSTRACT

Mechanical coupling for elastic axial and radial constraint with torsional freedom, especially for elastic pivots and suspensions and the like, comprising, according to the invention, a composite tubular member made of metal and elastomer (11) that exhibits high axial and radial rigidity and the ability to absorb vibrations induced by the mechanical system in which it is fitted and to compensate for manufacturing tolerances in that system, and a tubular insert (15), made of nonwear plastic material with a low coefficient of friction which is coaxial and integral, in the form of a fixed inner sleeve, with said composite tubular member (11) and engages with a rotating metallic component (16) fitted coaxially with respect to said tubular insert to provide the torsional freedom.

7 Claims, 1 Drawing Sheet

MECHANICAL COUPLING FOR ELASTIC AXIAL AND RADIAL CONSTRAINT WITH TORSIONAL FREEDOM, ESPECIALLY FOR ELASTIC PIVOTS AND SUSPENSIONS AND THE LIKE

The present invention relates to a mechanical coupling for elastic axial and radial constraint with torsional freedom, especially for elastic pivots and suspensions and the like.

The mechanical coupling according to the present invention finds application in, for example, the following sectors (the list that follows is an indication and not exhaustive):

the automotive sector, for
   elastic pivots for the connection of the suspension levers of front and/or rear axles;
   elastic pivots for connecting the anti-roll bar to the frame;
   elastic pivots for leaf-spring/frame connection;
   elastic pivot for the connection of the reaction rod of the power train;
farming and earth-moving machinery, for
   cabin support;
   joint for excavator arm;
rail and tram sector, for
   power cardan joints;
   steering box links.

Mechanical couplings are known, consisting generally of coaxial metal bushes between which a rubber sleeve is compressed (in effect making a rubber bush). These are used for absorbing torsional, axial and radial deformations.

The main shortcoming of these known couplings is the need to find a "physical" compromise between deformations in the axial and radial directions, and torsional deformations.

In particular, radial rigidity and torsional rigidity (at least within the range of limited angular amplitude of about ±30 degrees max.) are found to be directly proportional to each other and dependent on the amount of rubber inserted between the metal sleeves.

Moreover, axial rigidity is always low and it is impossible to absorb axial and/or torsional overloads.

Taking the above shortcomings as its starting point, the present invention aims to provide a remedy thereto.

GB 2.245.952 discloses an elastic link bearing composed of two identical bearing elements which are placed coaxially opposite one another and each of which is inserted into one of the end faces of a link lug. Two composite tubular member made of metal and elastomer are held in the link lug with a press fit.

The correct operation of the link bearing needs two opposite elastomeric bushes in order to react axially, in opposite directions, to the axial acting forces. The system reacts, substantially, only when the "elastomeric head" of the said bushes is compressed. Therefore their maximum axial shift cannot be controlled.

Due to the double bearing element, the link bearing permits the rotation of the outer structure in relation to the inner one exclusively if intermediate sleeves contact each other when urged by a great axial load. Furthermore, the relative rotation of the outer structure in relation to the inner one occurs only when an axial load is applied and maintained.

The elastic link bearing, due to its constructive design, does not allow the outer structure to make a 360° rotation in relation to the inner one, with a negligible friction at high frequencies.

In the elastic link bearing the torsional freedom depends exclusively on the applied axial load and is hence very scanty.

U.S. Pat. No. 5,069,431 discloses a bush assembly in which the axial forces can be applied in only one direction. Otherwise, if an axial force is applied, for instance, from right to left (with respect to FIG. 1), the bush assembly could be dissembled. From a constructive point of view, the bush assembly has only one axial stop.

The bush assembly prevents liquids and/or dirt from getting inside only by one side protected through a sealing member. Noise due to dirt penetration could therefore arise.

In the bush assembly, radial loads compress the lateral surface of the rotating insert and through the outer insert cause the rotation stop. Radial loads stop torsional freedom and a contact between the outer insert and the inner one may occur.

The mechanical coupling according to the present invention intends to overcome these drawbacks.

It is therefore the principal object of the present invention to provide a mechanical coupling, and in particular an elastic pivot or suspension, that is capable of reacting as an elastic constraint in the axial and radial directions, while yet at the same time presenting no torsional constraint at torque values close to zero (that is, "torsional freedom") or at any rate negligible in comparison with the forces present.

With this object in view, the present invention provides a mechanical coupling for elastic axial and radial constraint with torsional freedom, especially for elastic pivots and suspensions and the like, whose essential characteristic is the subject of the main claim, which should be regarded as incorporated here in its entirety.

Further advantageous characteristics are described in the dependent claims.

The mechanical coupling according to the invention presents many advantages, which may be summarized in its ability to provide:
   great radial rigidity,
   great axial rigidity,
   very low torsional rigidity,
   absorption of axial and/or radial overloads without permanent deformation,
while making the coupling itself independent of physical limits resulting from its construction and/or from the use of conventional constructional materials or processes.

The present invention will become clearer in the following detailed description, with reference to the attached drawings, which are provided purely by way of non-restrictive example, in which.

Figure 1:
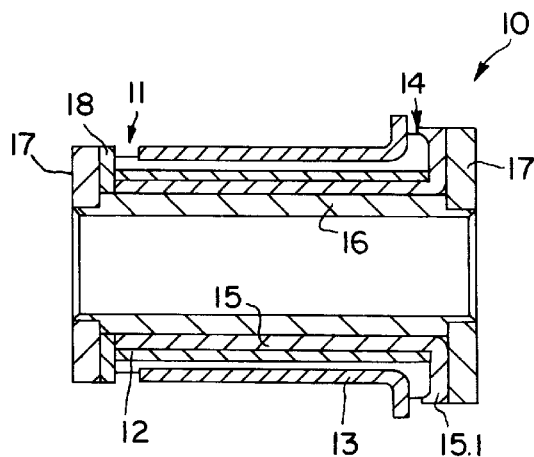
FIGS. 1 and 2 are views in axial section of two different examples of embodiments of the mechanical coupling for elastic axial and radial constraint with torsional freedom, in particular for elastic pivots and suspensions and the like, according to the present invention.

With reference to FIG. 1, the numeral 10 indicates the whole of the mechanical coupling for elastic axial and radial constraint with torsional freedom, in one example of an embodiment of the invention.

Said device 10 essentially comprises a composite tubular member 11 made up of two coaxial metal sleeves by way of an inner bush 12 and an outer bush 13, between which there is bonded a layer of elastomeric material 14, especially natural rubber, which in effect makes a rubber bush.

Into the interior of said composite tubular member 11 there is driven, coaxially and with appropriate interference by way of a fixed sleeve, a first tubular insert 15 made of nonwear plastic material with a very low coefficient of friction and high mechanical strength, which is flanged at one axial end 15.1, bringing it back against the layer of elastomeric material 14.

Another tubular insert 16, of a metallic material, is fitted so as to rotate coaxially inside said first tubular insert 15.

The numeral 17 denotes outer rings attached like flanges to the axial ends of said other tubular insert 16, while 18 denotes an inner ring set between an outer ring 17 and the non-flanged axial end of said first tubular insert 15, made of the same plastic material, to hold the coupling 10 together.

By means of the above construction, the mechanical coupling 10 performs the following specific functions:

very rigid reaction to axial and radial stresses owing to the compression with limited deflection of the elastomer 14 bonded between the two metal sleeves 12, 13 and further pre-compressed by a drawing action on the outer sleeve 13;

virtually no reaction to torsional torque, thanks to the relative rotation between the inner insert 16, made of metallic material, and the integral unit formed by the insert 15, made of plastic material with a low coefficient of friction, and by the composite tubular member 11, i.e. by the metal sleeves 12, 13 with the bonded elastomeric layer 14.

Said mechanical coupling 10 is constructed by bonding said layer of elastomeric material 14 between said two metal sleeves 12, 13 by a process of hot co-moulding, subjecting said elastomeric layer 14 to further pre-compression by a drawing action on the outer sleeve 13, driving in coaxially said first insert 15, made of low-friction plastic material, with interference to form a sleeve which is fixed with respect to the inner metal sleeve 12, and fitting said other insert 16, made of metallic material, so that it can rotate coaxially inside said first insert 15.

A layer of chemical grease, e.g. silicone grease, is advantageously introduced between said first insert 15 and said other insert 16 to improve the performance of the coupling and prevent noise from developing between the components.

Figure 2:
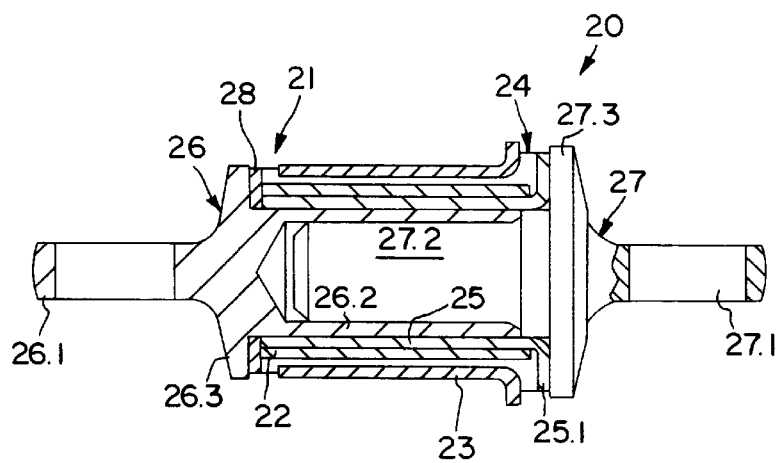
Figure 3:
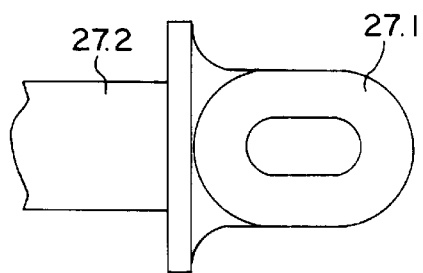
FIG. 3 is a partial view showing a detail in plan view of a component of the device shown in FIG. 2.

With reference now to FIGS. 2 and 3 of the drawings, the number 20 denotes the mechanical coupling for elastic axial and radial constraint with torsional freedom, in another example of an embodiment of the invention.

Said coupling 20 essentially comprises a composite tubular member 21 made up of two coaxial metal sleeves by way of an inner bush 22 and an outer bush 23, between which there is bonded a layer of elastomeric material 24, especially natural rubber, which in effect makes a rubber bush.

Into the interior of said composite tubular member 21 there is driven, coaxially and with appropriate interference by way of a fixed sleeve, a tubular insert 25, made of plastic material with a low coefficient of friction and high mechanical strength, and flanged at one axial end 25.1, bringing it back against the layer of elastomeric material 24.

A first pin 26, comprising an eye end 26.1 and an axially hollow cylindrical body 26.2, made of a metallic material, is driven cold, to give an interference fit, into another pin 27 comprising an eye end 27.1 and a cylindrical body 27.2, also made of a metallic material. The resulting assembly is then fitted so as to be able to rotate coaxially inside the tubular insert 25.

28 is a plastic ring inserted between a flange part 26.3 of said first pin 26 and said tubular member 21 with the fixed sleeve 25, while 27.3 is a flange part of said other pin 27 placed against the flange 25.1 of said fixed sleeve 25.

By means of this construction, the mechanical coupling 20 offers the same functions and the same advantages as shown with reference to the coupling 10.

As will be clear from the foregoing, the coupling according to the present invention essentially comprises:

a composite tubular member co-moulded in metal and elastomer (11; 21) that exhibits high axial and radial rigidity while also having the ability to absorb vibrations induced by the mechanical system in which it is fitted and to compensate for manufacturing tolerances in that system, and a tubular insert made of nonwear plastic material with a low coefficient of friction (15; 25) which is coaxial and integral, in the form of a fixed inner sleeve, with said composite tubular member (11; 21) and engages with a metallic component (16; 26) fitted coaxially and rotatably inside it to provide the torsional freedom.

In practice, of course, many variants may be made of what has been described and illustrated purely by way of non-restrictive examples, without thereby departing from the scope of the invention and hence from the scope of this industrial property document.

For example, instead of a layer of natural rubber, a layer of other elastomeric material, such as nitrile rubber, VAMAC etc. can be bonded between the metal sleeves.

What is claimed is:

1. A mechanical coupling for elastic axial and radial constraint with torsional freedom, especially for elastic pivots and suspensions and the like, comprising a composite tubular member made of metal and elastomer (11; 21) that exhibits high axial and radial rigidity and the ability to absorb vibrations induced by the mechanical system in which it is fitted and to compensate for manufacturing tolerances in that system, a tubular insert (15; 25) made of nonwear plastic material with a low coefficient of friction which is coaxial and integral, in the form of a fixed inner sleeve, with said composite tubular member (11; 21) and a rotating metallic component (16; 26) fitted coaxially with respect to said tubular insert (15; 25) which engages with said rotating metallic component to provide the torsional freedom, in which the composite tubular member (11; 21) is made up of two coaxial metal sleeves, between which there is bonded a layer of elastomeric material (14; 24) which, in effect makes a single rubber bush co-operating with opposite mechanical axial stops (15.1, 18; 25.1, 28), wherein said tubular insert (15; 25) is flanged at one axial end (15.1; 25.1), bringing it back against the whole layer of elastomeric material (14; 24), in order to provide one of the axial stops (15.1; 25.1) and to ensure a structural shifting control, so that axial forces can be applied in both axial directions.

2. The mechanical coupling of claim 1, further comprising a layer of grease between said tubular insert (15; 25) and said rotating component (16; 26).

3. The mechanical coupling of claim 1, wherein the composite tubular member (11; 21) is made up of two coaxial metal sleeves by way of an inner bush (12: 22) and an outer bush (13; 23).

4. The mechanical coupling of claim 1, wherein the elastomeric material between the coaxial metal sleeves is natural rubber.

5. The mechanical coupling of claim 1, wherein the rotating component (16; 26) is free to rotate 360° relative to an outer unit comprised of the tubular insert (15; 25) and the composite tubular member (11; 21).

6. The mechanical coupling of claim 1, wherein the elastomeric material (14; 24) is bonded between said metal sleeves (12,13; 22; 23) by hot co-molding and pre-compressed by a drawing action on the outer sleeve (13; 23).

7. The mechanical coupling of claim 1, wherein the mechanical axial stops (15.1,18; 25.1, 28) are made of the same plastic material as the tubular insert (15; 25).

* * * * *